(12) United States Patent
Mizuta et al.

(10) Patent No.: US 6,314,355 B1
(45) Date of Patent: Nov. 6, 2001

(54) STEERING ANGLE DETECTING MECHANISM

(75) Inventors: Ken Mizuta; Hironori Kato; Toshiyuki Hoshi; Yoshio Sanpei, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/611,511

(22) Filed: Jul. 7, 2000

(30) Foreign Application Priority Data

Jul. 12, 1999 (JP) .................................................. 11-197994

(51) Int. Cl.[7] ....................................................... B62D 5/00
(52) U.S. Cl. .............................. 701/41; 280/5.51; 340/465
(58) Field of Search ............................. 701/41; 280/5.51; 116/31; 172/278; 340/465; 446/460

(56) References Cited

U.S. PATENT DOCUMENTS

| | | | |
|---|---|---|---|
| 4,727,950 | * 3/1988 | Shimizu et al. | 180/79.1 |
| 4,735,271 | * 4/1988 | Shimizu | 180/79.1 |
| 4,794,536 | * 12/1988 | Eto et al. | 364/424.05 |
| 5,019,981 | * 5/1991 | Oshita et al. | 364/424.05 |
| 5,032,996 | * 7/1991 | Shiraishi | 36/424.05 |
| 5,065,324 | 11/1991 | Oshita et al. | |
| 5,119,302 | * 6/1992 | Abe et al. | 364/424.05 |
| 6,062,123 | * 5/2000 | Obata et al. | 91/375 |

FOREIGN PATENT DOCUMENTS

10033536-A1 * 1/2000 (DE) .............................. G01B/11/26
2000046536-A * 2/2000 (JP) .................................. B62D/1/04

* cited by examiner

Primary Examiner—William A. Cuchlinski, Jr.
Assistant Examiner—Olga Hernandez
(74) Attorney, Agent, or Firm—Brinks Hofer Gilson & Lione

(57) ABSTRACT

A steering angle detecting mechanism of this invention comprises: a plurality of photocouplers for detecting a steering angle of a steering wheel; a timer circuit for setting time; a first power source control unit which is controlled by the set time of the timer circuit and intermittently drives one of the plurality of photocouplers; a second power source control unit for driving the rest of the plurality of photocouplers; a wake-up circuit for generating a wake-up signal when a detection value of the single photocoupler is different from the immediately preceding detection value of the single photocoupler; and a micro control unit which is switched between a sleep mode and a wake-up mode. The micro control unit is switched to the sleep mode when an ignition switch is turned off, and to the wake-up mode for predetermined time when the wake-up signal is supplied, in the sleep mode, the micro control unit intermittently drives the single photocoupler at predetermined intervals and allows the wake-up circuit to generate the wake-up signal on the basis of the detection value of the single photocoupler, and in the wake-up mode, the micro control unit drives the plurality of photocouplers, detects a steering angle on the basis of detection values of the plurality of photocouplers, and stores the detection result.

5 Claims, 2 Drawing Sheets

STEERING ANGLE DETECTING MECHANISM

BACKGROUND OF THE INVENTION

1. Field of the Invention

The present invention relates to a steering angle detecting mechanism and, more particularly, a steering angle detecting mechanism in which supply of power is not interrupted in an off state of an ignition switch with reduced power consumption in the steering angle detecting mechanism.

2. Description of the Related Art

A steering angle detecting mechanism generally detects a steering angle of a steering wheel of a vehicle and comprises: a plurality of photocouplers each comprised of a light emitting element and a photodetecting element; a power source control unit for sequentially intermittently driving the plurality of photocouplers at predetermined intervals; and a micro control unit which drives the power source control unit, receives detection values outputted from the plurality of photocouplers, and calculates an absolute angle of a steering angle of the steering wheel from the detection values.

In this case, the plurality of photocouplers are arranged in positions where a light signal transmitted between the light emitting element and the photodetecting element changes according to the turn of the steering wheel, that is, positions where the turn state of the steering wheel can be detected. A change in the detection values of the plurality of photocouplers obtained according to the turn of the steering wheel is calculated by the micro control unit to thereby obtain the absolute angle of the steering angle of the steering wheel.

When the vehicle is not in use, that is, when the ignition switch is in an off state, since it is recognized that the steering wheel is not steered, the known steering angle detecting mechanism is switched to the standby mode at the same time the ignition switch is turned off. Although it is relatively rare, even in the inoperative state of the vehicle after the ignition switch is turned off, there is a case that the steering wheel is turned (operated). When the steering wheel is turned (operated) in the standby mode, the known steering angle detecting mechanism does not detect the steering angle of the turned (operated) steering wheel. When the ignition switch is turned on again and the steering angle detecting mechanism enters an normal operation mode, there is consequently an inconvenience such that a deviation occurs between the newly detected absolute angle of the steering angle and the actual absolute angle.

In order to solve the inconvenience, the following steering angle detecting mechanism is considered. When the ignition switch is turned off, the steering angle detecting mechanism is not switched to the standby mode but is maintained in the normal operation mode. In the normal operation mode, a plurality of photocouplers are driven at predetermined intervals and the absolute angle of the steering angle of the steering wheel is sequentially calculated on the basis of the detection values outputted from the plurality of photocouplers.

The newly devised steering angle detecting mechanism has, however, another inconvenience such that, since the mechanism is always set in the normal operation mode, the amount of consumption power of the vehicle-mounted power source (battery) when the vehicle is not used is large.

SUMMARY OF THE INVENTION

The present invention has been achieved in consideration of the technical background and its object is to provide a steering angle detecting mechanism capable of periodically detecting the steering angle of the steering wheel in a state where the power consumption is low when the ignition switch is off.

In order to achieve the object, according to the invention, there is provided a steering angle detecting mechanism comprising: a plurality of photocouplers for detecting a steering angle of a steering wheel; a timer circuit for setting time; a first power source control unit which is controlled by the set time of the timer circuit and intermittently drives one of the plurality of photocouplers; a second power source control unit for driving the rest of the plurality of photocouplers; a wake-up circuit for generating a wake-up signal when a detection value of the single photocoupler is different from the immediately preceding detection value of the single photocoupler; and a micro control unit which is switched between a sleep mode and a wake-up mode, wherein the micro control unit is switched to the sleep mode when an ignition switch is turned off, and to the wake-up mode for predetermined time when the wake-up signal is supplied, in the sleep mode, the micro control unit intermittently drives the single photocoupler at predetermined intervals and allows the wake-up circuit to generate the wake-up signal on the basis of the detection value of the single photocoupler, and in the wake-up mode, the micro control unit drives the plurality of photocouplers, detects a steering angle on the basis of detection values of the plurality of photocouplers, and stores the detection result.

In the construction, when the ignition switch is turned off, the micro control unit enters the sleep mode. In the sleep mode, one of the photocouplers is intermittently driven. When a detection value of the single photocoupler is the same as the previous detection value, the intermittent driving of the single photocoupler is repeated. Only when the detection value of the photocoupler is different from the immediately preceding detection value, the micro control unit is switched to the wake-up mode, drives all of the photocouplers, and obtains detection values of the photocouplers. After elapse of predetermined time, the micro control is again switched to the sleep mode. Consequently, the power consumption by the steering angle detecting mechanism can be largely reduced.

Preferably, in the steering angle detecting mechanism according to the invention, the interval at which the single photocoupler is intermittently driven is set in a range from 0.01 to 90 m sec.

When the interval of intermittently driving the single photocoupler is set shorter than 0.01 m sec, the driving time of the photocoupler becomes too short and a problem such that it is difficult to periodically detect the rotating timings of the steering wheel often occurs. On the other hand, when the interval of intermittent driving becomes longer than 90 m sec, a problem occurs such that it is difficult to accurately detect the rotational angle at the rotational speed level at which the steering wheel is rotated 6 times per second. It is therefore preferable to set the interval at which the single photocoupler is intermittently driven within the above range.

With the construction, the power consumption in the steering angle detecting mechanism can be reduced and the steering angle can be periodically detected with high reliability.

Further, in the steering angle detecting mechanism according to the invention, driving time of the single photocoupler is 0.005 m sec or longer and is set to 50% or lower of the interval at which the photocoupler is intermittently driven.

When the driving time of the single photocoupler is set to less than 0.005 m sec, the driving time is too short to make the photocoupler respond. A problem such that it is difficult to accurately detect the steering angle of the steering wheel occurs. When the driving time of the photocoupler is 50% or lower of the interval, the shorter the driving time is, the more the power consumption of the steering angle detecting mechanism can be reduced. Thus, it is desirable to set the driving time of the photocoupler within the range.

With such a construction, the power consumption can be reduced more than the half as compared with that of the conventional technique. The power which is larger than the power consumed to drive the circuits except for the photocouplers in the steering angle detecting mechanism can be reduced. Consequently, the effect of reduction in the power consumed by the steering angle detecting mechanism can be increased conspicuously and the steering angle can be detected periodically and accurately.

As a preferred embodiment of the construction, the interval at which the single photocoupler is intermittently driven is selected as 30 m sec. The driving time of the single photocoupler when the interval is 30 m sec is 2 m sec. The interval between the driving time is selected as 28 m sec.

With the construction, when an ignition switch is turned off, the micro control unit is switched to the sleep mode. In the sleep mode, the micro control unit intermittently drives a single photocoupler. When a detection value of the single photocoupler is the same as the immediately preceding detection value, the intermittent driving of the single photocoupler is repeated. Only when the detection value of the photocoupler is different from the immediately preceding detection value, the micro control unit is switched to a wake-up mode. The micro control unit drives all the photocouplers and obtains detection values of the photocouplers. After elapse of predetermined time, the micro control unit is again switched to the sleep mode. Consequently, the power consumption in the steering angle detecting mechanism is largely reduced to about $\frac{1}{15}$ of that of the above-described newly-devised steering angle detecting mechanism.

In this case, when the interval at which the single photocoupler is intermittently driven is selected so as to be shortened, the effect of reducing the power consumption deteriorates. On the other hand, when the interval is selected so as to become longer, the effect of reducing the power consumption increases. In the latter case, however, when a detection value obtained from the single photocoupler changes, the micro control unit is switched to the wake-up mode, and the steering angle is detected by using detection values from all of the photocouplers, there is a case such that the steering wheel is turned more than 180° in one direction or the other direction while the micro control unit checks the detection values from all of the photocouplers. In such a state, the micro control unit does not know the direction in which the steering wheel has turned from the original position, so that absolute angle data obtained by the turn of the steering wheel becomes erroneous. In order to reduce the power consumption and prevent the occurrence of such a data error, it is necessary to choose the interval within the optimum range in which the interval is not too short and too long.

Generally, it is considered as follows. When the steering wheel of a vehicle is rotated quickest, it takes about 1 second (1000 m sec) to rotate the steering wheel in one direction and the other direction three times each (the wheel is rotated total six times through about 2000°). From this calculation of the value, it takes about 90 m sec to turn the steering wheel 180°. Since this value is of the case where the steering wheel is turned 180°, it is necessary to use a value smaller than the value so as to have an allowance. Further, in the case of deciding the steering angle of the steering wheel, it is necessary to slightly turn the wheel to detect the edge of the Z phase. In consideration of the above factors and production of the effect of reducing power consumption, it was found to be optimum to select 30 m sec as the interval, which is required to turn the steering wheel $\frac{1}{3}$ of 180°, that is, 60°.

In the preferred embodiment, therefore, the interval is selected as 30 m sec. Consequently, the power consumption can be reduced, occurrence of a data error can be prevented, and the accurate steering angle can be detected.

DETAILED DESCRIPTION OF THE PREFERRED EMBODIMENT

An embodiment of the invention will be described hereinbelow with reference to the drawings.

Figure 1:
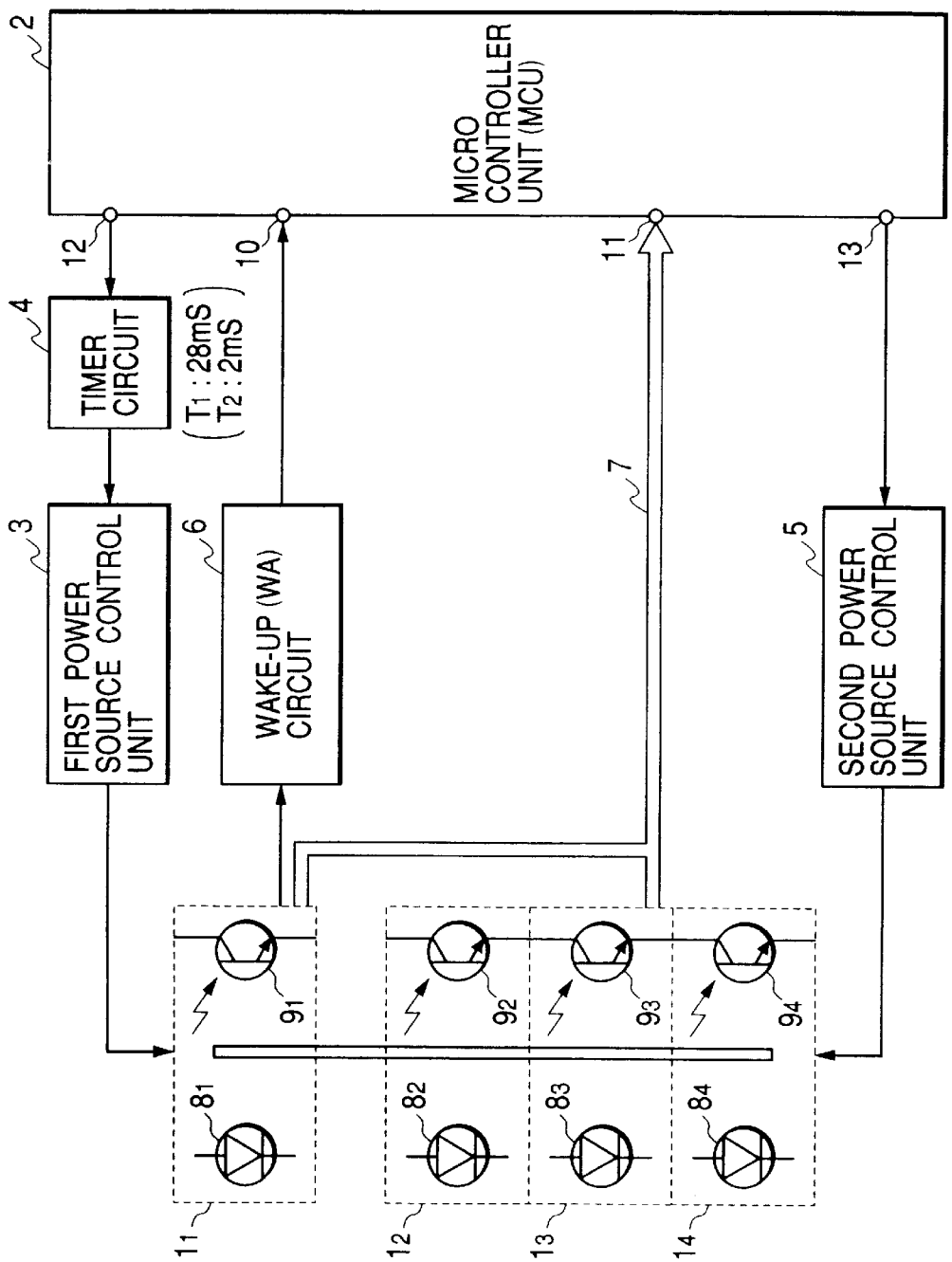
FIG. 1 is a block diagram showing an embodiment of a steering angle detecting mechanism according to the invention.

FIG. 1 is a block diagram showing a steering angle detecting mechanism according to an embodiment of the invention.

As shown in FIG. 1, the steering angle detecting mechanism according to the embodiment comprises: first, second, third, and fourth photocouplers $1_1$, $1_2$, $1_3$, and $1_4$; a micro controller unit (MCU) 2; a first power source control unit 3; a timer circuit 4; a second power source control unit 5; a wake-up (WA) circuit 6; and a bus line (transmission line) 7. The first photocoupler $1_1$ is comprised of a first light emitting element (EL1) $8_1$, and a first photodetecting element (RL1) $9_1$. The second photocoupler $1_2$ is comprised of a second light emitting element (EL2) $8_2$ and a second photodetecting element (RL1) $9_2$. The third photocoupler $1_3$ is comprised of a third light emitting element (EL3) $8_3$ and a third photodetecting element (RL3) $9_3$. The fourth photocoupler $1_4$ is comprised of a fourth light emitting element (EL4) $8_4$ and a fourth photodetecting element (RL1) $9_4$. The MCU 2 has a wake-up signal input terminal 10, a detection value input terminal 11, a first control signal output terminal 12 and a second control signal output terminal 13.

The power supply terminal of the first photocoupler $1_1$ is connected to the output terminal of the first power source control unit 3 and a signal detection terminal of the first photocoupler $1_1$ is connected to both the input terminal of the wake-up circuit 6 and the first control signal output terminal 12 via the bus line 7. The power supply terminal of each of the second to fourth photocouplers $1_2$ to $1_4$ is connected to the output terminal of the second power source control unit 5 and the signal detection terminal of each of the second to fourth photocouplers $1_2$ to $1_4$ is connected to the first control signal output terminal 12 via the bus line 7. The input terminal of the first power source control unit 3 is connected to the output terminal of the timer circuit 4. The input terminal of the timer circuit 4 is connected to the first control signal output terminal 12.

The output terminal of the wake-up circuit 6 is connected to the wake-up signal input terminal 10. The input terminal of the second power source control unit 5 is connected to the second control signal out put terminal 13. The light transmission paths are provided each between the first light emitting element $8_1$ and the first photodetecting element $9_1$, between the second light emitting element 82 and the second photodetecting element $9_2$, between the third light emitting element $8_3$ and the third photodetecting element $9_3$, and between the fourth light emitting element $8_4$ and the fourth photodetecting element $9_4$. The first to fourth photocouplers $1_1$ to $1_4$ are disposed so that the steering wheel is related to each of the light transfer paths. When the steering wheel is steered, the light transfer state of at least one of the light transfer paths changes, and the detection value accordingly changes.

In the timer circuit 4, first set time $T_1$, is selected as 28 m sec and second set time $T_2$ is selected as 2 m sec under the control of the MCU 2. In this case, the reason why the first and second set time $T_1$ and $T_2$ is selected as 28 m sec and 2 m sec of total 30 m sec is as follows. Generally, when the steering wheel of a vehicle is rotated quickest, it takes about 1 second (1000 m sec) to rotate the steering wheel alternately in one direction and the other direction three times each (the wheel is rotated total six times through about 2000°). From this calculation of time, although it is derived that it takes 90 m sec to turn the steering wheel 180°, 90 m sec is the value when the steering wheel is turned 180° and a value obtained by properly deducting a certain value from 90 m sec has to be used in practice. Besides, at the time of regular measurement, when the absolute angle is determined, it is necessary to slightly turn the wheel to detect the edge of the Z phase. In consideration of this slight turn, the deducted value, and saving of power consumption, it was found to be optimum to select 30 m sec to turn the steering wheel ⅓ of 180°, that is, 60°.

The first power source control unit 3 intermittently supplies the power source voltage to the first photocoupler $1_1$, on the basis of the second set time $T_2$ of the timer circuit 4. The second power source control unit 5 supplies a power source voltage simultaneously to the second to fourth photocouplers $1_2$ to $1_4$ by the control of the MCU 2.

Figure 2:
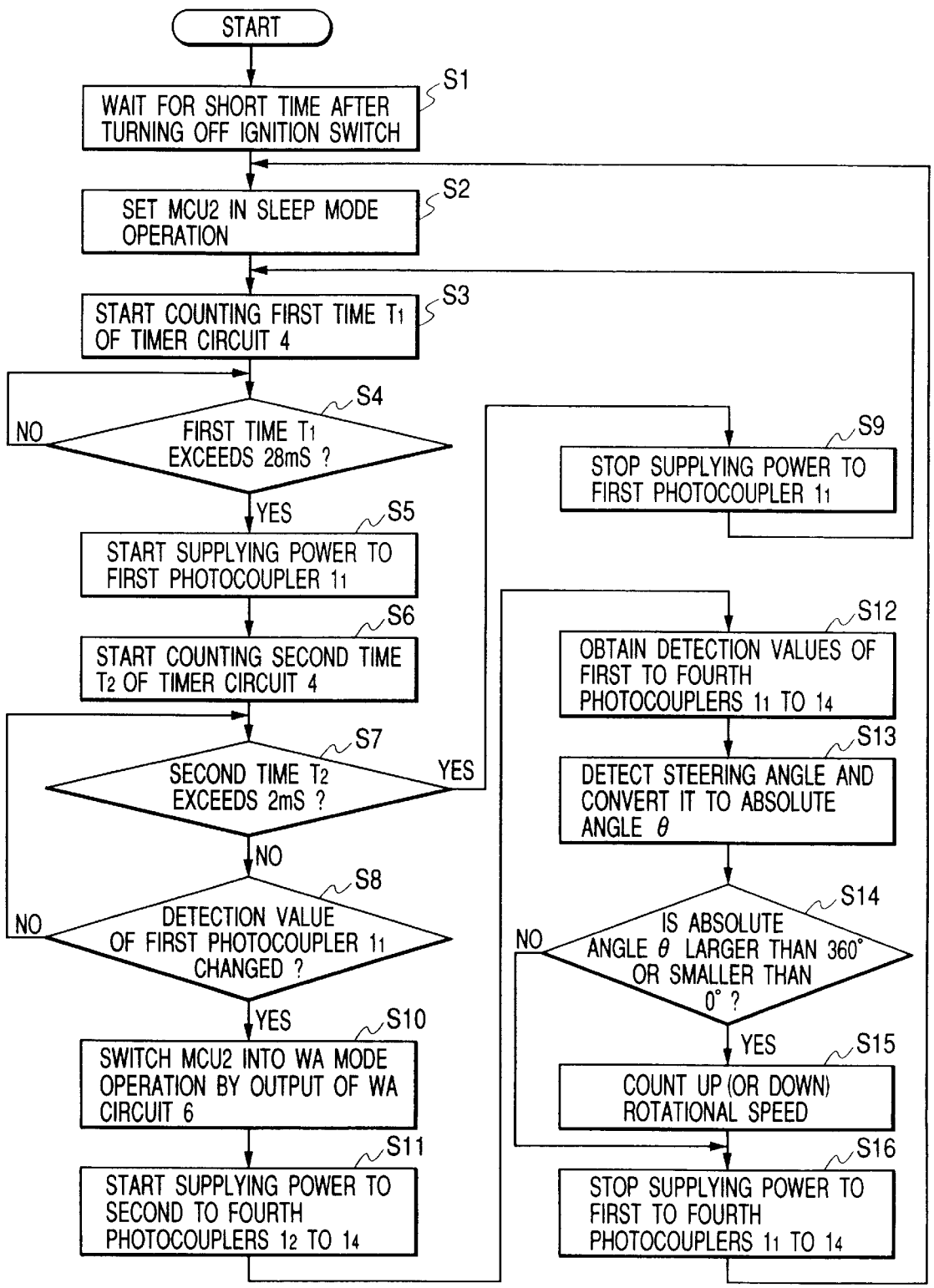
FIG. 2 is a flowchart showing the flow of operations performed by the steering angle detecting mechanism shown in FIG. 1.

FIG. 2 is a flowchart showing the flow of main operations performed by the steering angle detecting mechanism shown in FIG. 1.

By using the flowchart of FIG. 2, the operations of the steering angle detecting mechanism of the embodiment will be described as follows.

First, in step S1, when it is detected that the ignition switch is turned off, the MCU 2 enters a standby mode for short time.

In step S2, after elapse of the short time in step S1, the MCU 2 enters a sleep mode. In the sleep mode, the MCU 2 does not supply the power source voltage to each of the first to fourth photocouplers $1_1$ to $1_4$ except for the operations in step S3 and subsequent steps.

In step S3, the MCU 2 drives the timer circuit 4 via the first control signal output terminal 12 and the timer circuit 4 starts counting the first set time $T_1$ (28 m sec).

Subsequently, in step S4, the MCU 2 determines whether the counting operation of the timer circuit 4 has been performed longer than the first set time $T_1$ or not. When it is determined that the counting operation has been performed longer than the first set time $T_1$ (Y), the MCU 2 advances to step S5. On the other hand, when it is determined that the counting operation has not been performed longer than the first set time $T_1$ (N), the operation of step S4 is repeated.

In step S5, the first power source control unit 3 is driven by the count-up of the timer circuit 4. The power source voltage is supplied from the first power source control unit 3 to the first photocoupler $1_1$ to make the first photocoupler $1_1$ operative.

Simultaneously, in step S6, the MCU 2 drives the timer circuit 4 via the first control signal output terminal 12 and the timer circuit 4 starts counting the second set time $T_2$ (2 m sec).

In step S7, the MCU 2 determines whether the counting operation of the timer circuit 4 has been performed longer than the second set time $T_2$ or not. When it is determined that the counting operation has been performed longer than the second set time $T_2$ (Y), the MCU 2 advances to step S9. On the other hand, when it is determined that the counting operation has not been performed longer than the second set time $T_2$ (N), the MCU 2 advances to step S8.

In step S8, the MCU 2 drives the wake-up circuit 6. The wake-up circuit 6 compares the detection value of this time supplied from the first photocoupler $1_1$ with the previous detection value supplied from the first photocoupler $1_1$ and determines whether the detection value of this time has changed or not. When it is determined that the detection value of this time has changed (Y), the wake-up circuit 6 outputs a wake-up signal and the routine advances to step S10. When it is determined that the detection value of this time has not changed (N), the routine is returned to step S7 and the operations in step S7 and subsequent steps are performed.

In step S9, by the count-up of the timer circuit 4, the first power source control unit 3 is made non-operative. The supply of the power source voltage from the first power source control unit 3 to the first photocoupler $1_1$, is stopped, thereby making the first photocoupler $1_1$ non-operative. After that, the routine is returned to step S3 and the operations in step S3 and subsequent steps are executed.

In step S10, the wake-up signal is supplied from the wake-up circuit 6 to the wake-up signal input terminal 10 and the MCU 2 is switched from the sleep mode to the wake-up mode.

In step S11, the MCU 2 drives the second power source control unit 5 via the second control signal output terminal 13. The power source voltage is supplied from the second power source control unit 5 simultaneously to all of the second to fourth photocouplers $1_2$ to $1_4$ to make the second to fourth photocouplers $1_2$ to $1_4$ simultaneously operative. At this time point, the power source voltage is supplied from the first power source control unit 3 also to the first photocoupler $1_1$, so that the first photocoupler $1_1$ is also made operative.

In step S12, the MCU 2 obtains detection values supplied from the first to fourth photocouplers $1_1$ to $1_4$ via the bus line 7 and the first control signal output terminal 12.

In step S13, the MCU 2 detects the steering angle from the obtained detection values and acquires the absolute angle θ converted from the detection result. The MCU 2 temporarily stores the obtained detection value and absolute angle θ into an internal memory (not shown).

In step S14, the MCU 2 determines whether or not the absolute angle θ obtained in step S13 is out of the range from 0° to 360° (larger than 360° or smaller than 0°). When it is determined that the absolute angle θ is out of the range from 0° to 360° (Y), the MCU 2 advances to step S15. On the other hand, when it is determined that the absolute angle θ lies within the range from 0° to 360° (N), the MCU 2 advances to step S16.

In step S15, when the obtained absolute angle is larger than 360°, the MCU 2 counts up the number of rotations. When the obtained absolute angle is smaller than 0°, the MCU 2 counts down the number of rotations.

In step S16, the MCU 2 controls the first power source control unit 3 via the first control signal output terminal 12 and controls the second power source control unit 5 via the second control signal output terminal 13. The MCU 2 stops the supply of the power source voltage from the first power source control unit 3 to the first photocoupler $1_1$. Simultaneously, the MCU 2 stops the supply of the power source voltage from the second power source control unit 5 to the second to fourth photocouplers $1_2$ to $1_4$. The first to fourth photocouplers $1_1$ to $1_4$ are therefore made non-operative. After that, the routine is returned to step S2 and the operations in step S2 and subsequent steps are executed again.

As described above, in the embodiment, the power consumption can be reduced and occurrence of a data error is prevented, so that the accurate steering angle can be detected.

As described above, according to the invention, when the ignition switch is turned off, the micro control unit enters the sleep mode. In the sleep mode, one photocoupler is intermittently driven. When the detection value of the single photocoupler coincides with the previous detection value, the intermittent driving of the single photocoupler is repeated. Only when the detection value of the photocoupler is different from the previous detection value, the micro control unit is switched to the wake-up mode in which all of the photocouplers are driven and detection values of the photocouplers are obtained. After elapse of predetermined time, the micro control unit is again switched to the sleep mode. Consequently, there is an effect such that the power consumption in the steering angle detecting mechanism can be largely reduced to about 1/15 of that of the conventional steering angle detecting mechanism.

According to the invention, when a value from 0.01 to 90 m sec is selected as the interval of the intermittent driving of the single photocoupler, there are effects such that the power consumption can be reduced, the occurrence of a data error is prevented, and the steering angle can be detected accurately.

What is claimed is:

1. A steering angle detecting mechanism comprising:

a plurality of photocouplers to detect a steering angle of a steering wheel;

a timer circuit to set time;

a first power source control unit which is controlled by set time of the timer circuit and intermittently drives one of the plurality of photocouplers;

a second power source control unit to drive a remainder of the plurality of photocouplers;

a wake-up circuit to generate a wake-up signal when a detection value of the single photocoupler is different from an immediately preceding detection value of the single photocoupler; and a micro control unit which is switched between a sleep mode and a wake-up mode, wherein the micro control unit is switched to the sleep mode when an ignition switch is turned off, and to the wake-up mode for a predetermined time when the wake-up signal is supplied, in the sleep mode, the micro control unit intermittently drives the single photocoupler at predetermined intervals and allows the wake-up circuit to generate the wake-up signal depending on the detection value of the single photocoupler, and in the wake-up mode, the micro control unit drives the plurality of photocouplers, detects the steering angle depending on the detection values of the plurality of photocouplers, and stores the detection result.

2. The steering angle detecting mechanism according to claim 1, wherein an interval at which the single photocoupler is intermittently driven is in a range from 0.01 to 90 m sec.

3. The steering angle detecting mechanism according to claim 2, wherein a driving time of the single photocoupler at the interval is not less than 0.005 m sec and is not greater than 50% of the interval.

4. The steering angle detecting mechanism according to claim 2, wherein the interval at which the single photocoupler is intermittently driven is 30 m sec.

5. The steering angle detecting mechanism according to claim 2, wherein a driving time of the single photocoupler at the interval is 2 m sec and an interval between the driving time is 28 m sec.

* * * * *